Dec. 2, 1924.                                               1,517,486
A. BADOWSKI
TRANSPARENT CAP FOR TIRE STEM PRESSURE GAUGES
Filed Oct. 19, 1921

Alfred Badowski
Inventor.
By
Attorney.

Patented Dec. 2, 1924.

1,517,486

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TRANSPARENT CAP FOR TIRE-STEM PRESSURE GAUGES.

Application filed October 19, 1921. Serial No. 508,734.

*To all whom it may concern:*

Be it known that I, ALFRED BADOWSKI, a citizen of the United States, residing at Charleston, in the county of Kanawha and State of West Virginia, have invented new and useful Improvements in Transparent Caps for Tire-Stem Pressure Gauges, of which the following is a specification.

The invention relates to transparent caps which are mounted on pressure gauges formed on tire stems. These gauges are subjected to severe shock and to strain as they are removed and put in place. To make the pressure gauge useful it is necessary that the gauge be transparent and the most available material for this purpose is glass. The glass does not lend itself readily to being directly secured to the tire stem and it is, therefore, necessary to supply a metal base and the metal base must be so secured to the glass as to relieve the glass of strain otherwise the glass will break under shock.

The invention is illustrated in the accompanying drawings as follows:—

Figures 1, 3:
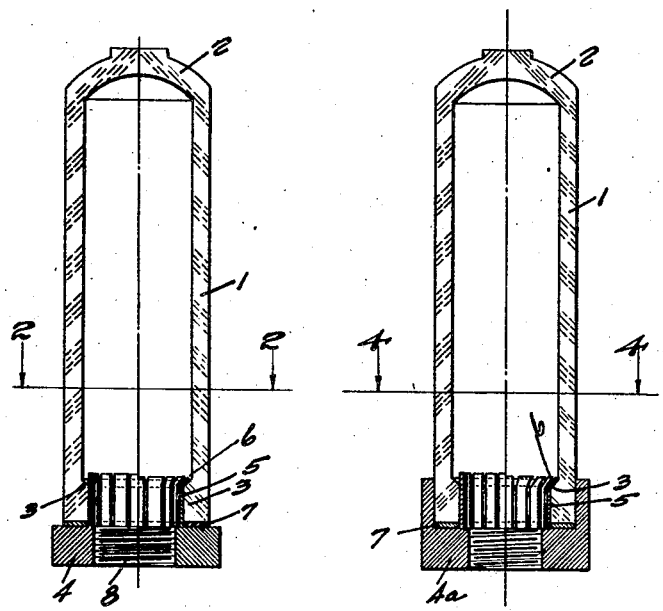

Fig. 1 shows a central vertical section of one variation of the invention.

Figures 2, 4:
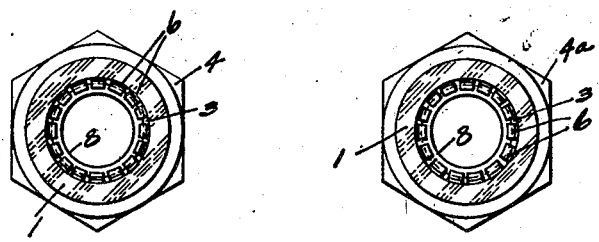

Fig. 2 a section on the line 2—2 in Fig. 1.

Fig. 3 a central vertical section of another variation of the invention.

Fig. 4 a section on the line 4—4 in Fig. 3.

1 marks the glass tube and 2 a closure for the tube. The glass tube has an internal shoulder 3 at its inner end. A metal base 4 has the upwardly extending projections 5 arranged within the tube and the upper ends of these projections are bent over at 6 engaging the shoulder 3 with some resilience so that the glass is relieved of strain. The projections 5 are preferably separated into short units circumferentially so that they may be bent readily. A washer 7 of felt or similar material is placed between the glass and the base and the base is provided with a screw-threaded opening 8 through which the valve stem may be screwed so that the pressure gauge may be arranged in the glass tube 1.

The structure shown in Figs. 3 and 4 is similar to that described except that the base 4ª is provided with an outer wall or shoulder engaging the outer periphery of the glass tube and assisting in sustaining the same and also providing a larger surface which may be grasped by the operator in putting it in place on the valve stem.

What I claim as new is:—

1. A transparent cap for tire stem pressure gauges comprising a transparent tube provided with a closure at its outer end and open at its inner end; a metal base having a wall extending around the tube at its inner end; and means extending upwardly from the base and engaging the inner wall of the tube, and locking the tube against axial movement relatively to the base, said base having a screw-threaded opening adapted to be screwed on to a tire stem.

2. A transparent cap for tire stem pressure gauges comprising a transparent tube provided with a closure at its outer end and open at the inner end, said tube having an internal shoulder at its inner end; and a metal base having a wall extending around the tube at its inner end and upwardly extending projections of material permitting the bending of the upper ends of the projections over the shoulder on the tube.

In testimony whereof I have hereunto set my hand.

ALFRED BADOWSKI.